United States Patent

Streng

[15] 3,639,763
[45] Feb. 1, 1972

[54] DEVICE FOR MEASURING THE THICKNESS OF METALLIC LAYERS UTILIZING BETA RAY BACKSCATTERING

[72] Inventor: Ludwig Streng, 7036 Schonaich, Fulkenstr. 9, Germany

[22] Filed: Jan. 22, 1970

[21] Appl. No.: 4,903

[30] Foreign Application Priority Data

Nov. 25, 1969 Germany ....................P 19 59 008.0

[52] U.S. Cl..................250/83.3 D, 250/71.5 R, 250/83.3 R, 250/83.6 R
[51] Int. Cl. .....................................G01t 1/17, G01n 23/06
[58] Field of Search....................250/83.3 D, 83.3 R, 71.5 R, 250/83.6 R

[56] References Cited

UNITED STATES PATENTS 3,271,572  9/1966  Lieber et al.......................250/83.3 D
3,460,030  8/1969  Branton et al..................250/83.3 D X Primary Examiner—James W. Lawrence
Assistant Examiner—Morton J. Frome
Attorney—Christel & Bean

[57] ABSTRACT

A device for measuring thickness of layers when a radioactive nuclide bombards the layer to produce an irradiation having an energy level corresponding to the thickness of the layer. A detector absorbs radiation backscattered from the layer and possibly from a carrier material if present, and produces output pulses at a rate between that corresponding to a layer of zero thickness and that corresponding to a quasi-endlessly thick layer. An integration stage coupled to the output of the detector produces a voltage proportional to the rate of pulses from the detector. A voltage compensation stage connected to the integration stage output produces a voltage equal to and opposite in sign with respect to the output voltage of the integration stage, which corresponds to the pulse rate of the backscattering pertaining to the zero thickness of the layer. The output voltages of the integration and voltage compensation stages are conducted at a common point which, in turn, is connected with a network controllable in its transmission gain and loss. The network is connected with an equalizer for linearizing a mathematical function which represents a family of calibration curves correlating thickness with measured backscattering. A recording device connected to the equalizer amplifier permits readings of layer thickness to be obtained.

7 Claims, 4 Drawing Figures

DEVICE FOR MEASURING THE THICKNESS OF METALLIC LAYERS UTILIZING BETA RAY BACKSCATTERING

BACKGROUND OF THE INVENTION

The invention relates to a device for measuring of the thickness of layers with a radioactive nuclide irradiating (bombarding) the layer, which produces a radiation corresponding to the thickness of the layer in its energy, with a detector recording the backscattering, backscattered from the layer and a carrier material present if need be, and producing a pulse rate at its exit and specially in the area between a lower first count corresponding to the backscattering pertaining to a zero thickness of the layer and an upper second count below and corresponding to a layer of quasi-endless thick layer, and with a recording device fed by the detector.

It has been known to measure the thickness of thin metallic or nonmetallic layers by the backscattering measuring process with beta rays. In that case a radiator emits beta rays. The layer to be measured lies at a small distance from the radiator on a measuring table which has a slit, which is 1 mm. in size and therefore makes visible to the radiator only a fraction of the layer that is to be measured. The measuring surface is limited definitely through the slit. The beta rays enter into interaction with the atoms of the layer to be measured. At the same time, the more the beta rays are reflected, the thicker the layer is. If the layer is applied to a carrier material, then the number of the atoms of the layer to be measured must be different from the number of the atoms of the carrier layer.

The backscattered beta rays are collected by a Geiger-Muller counting tube. From the number of the backscattered particles one can now draw conclusions as to the thickness of the layer after the device has been calibrated on the basis of a few standards with a known thickness of the layer.

Among the many factors which enter into such a calibration are the duration of measurement, the size of the slit, the type of radiator, the nuclear-physical property of the layer to be measured, the nuclear-physical property of the carrier material, the energy distribution of the primary radiation, the spatial arrangement of the radiator in relation to the slit, etc. Naturally in practice—also from the point of view of the manufacture—one can not make as many calibrations as are necessary per se. Therefore, it is preferable to relinquish precision of measurement and to put up with an error of up to 20 percent.

One known measuring device uses for every radiator a certain scale with a linear and a nonlinear range. The scales have been arranged so that they can be exchanged easily and they are empirically calibrated by the producer. The scale must be exchangeable because a new scale is needed for every measuring problem. A certain scale pertains to every radioactive nuclide, so that at least 20 scales must be available. Thus, mix-ups may occur if the wrong scale is used in the case of a certain measuring problem. Besides, these scales are very expensive. Furthermore, with this type of device one will not succeed in correcting the influence of the size of the slit on the correlation between the thickness of the layer and backscattered particles.

Radioactive nuclides have a finite half-life and they must be replaced from time to time. The radioactive nuclides have the shape of a small ball. Because of the variable self-absorption, because of scattering finishing parameters and so forth, the energy distribution of the irradiation varies despite the same radiation substance, a factor which also becomes noticeable in the course of the scale. In itself one would have to supply a new scale for every individual radioactive nuclide and to be sure each time for the measuring problem presented. Whenever the radioactive nuclide is used up, the entire set of scales pertaining to it would also be unusable thereby. In practice one cannot expect this burden and one would rather put up with errors in measurement.

Radioactive nuclides do not irradiate constantly but they will emit a variable number of particles during a predetermined time interval. Therefore, statistical errors will develop, which one tries to keep small by making the measuring time long, as a result of which the relative statistical error becomes smaller. However the fact is, that the statistical error will decrease only with the root of the measuring time, so that twice as long a measuring time will bring about no decrease in the relative error to the half. If, however, one changes the measuring time, then the known device must be newly calibrated. This is accompanied by new complications. (U.S. Pat. No. 3,271,572).

In the case of a known device of this type, only a single scale is still necessary, and it is subdivided into two areas. The first area corresponds to the beginning linear correlation between the thickness of the layer and the measured backscattering, while the other part represents the area which no longer is linear. In this case two measuring standards of variable thickness of layer are used for the calibration, whose thicknesses of layer lie within the nonlinear area. In this case too one must calibrate anew, if the measuring time deviates from that measuring time which formed the basis of the preceding calibration.

It has also been known to measure the thickness of layer digitally. In that case the particles backscattered during a previously determined time interval are counted. No calibration of the absolute value is necessary in this case. The change in the counted value is exploited graphically by using semilogarithmic divided ruled paper, whereby the values of backscattering are recorded with two controlling standards, which pin point the nonlinear area.

SUMMARY OF THE INVENTION

It is the task of the invention to produce a device which will permit the measurement of the thickness of the layer with a single indicating device operating linearly in its entire area, whereby the calibration made for the special measuring problem will be valid for all measuring times and can be accomplished with a few manipulations. The invention is based on the realization that the calibration curves which appear with very considerable variations in the case of a change in the above mentioned parameters are members of a family of curves of the type $Y=A(e^{Bx}-1)$ obeying a common law, whereby $Y$ is the thickness of the layer applied to the carrier material, $A$ is a constant giving the parallel shifting of the function, $B$ is a constant stating the ascent of the function, $e=2.71$ ... and $x$ is a value corresponding to the count of the detector.

According to the invention this task will be solved through the fact that an integration phase will be connected to the detector on the outlet side, said phase producing an output voltage proportional to the number of the pulse rate emitted by the detector, that a voltage compensation phase is connected to the integration phase on the outside, with which a compensation voltage can be produced, which, according to the value, is equal to but opposite in sign to such an output voltage of the integration phase, which corresponds to the pulse rate of the backscattering pertaining to zero thickness of the layer, that both the output voltage of the integration phase and the output voltage of the voltage-compensation semilogarithmic are conducted at one common point, that the common point is connected with a network that can be controlled in its transmission gain and loss, that the network is connected with a second equalizer amplifier linearizing the function $Y=A(e^{Bx}-1)$, whereby $Y=$ thickness of the layer to be measured, $A=$ a constant giving the difference between the zero thickness of the layer and the saturation thickness of the layer, as well as taking into account the radioactive nuclide, stating the parallel shift, the point being in semilogarithmic presentation, $B=$ a constant, stating the difference between the zero thickness of the layer and the saturation thickness of the layer, as well as taking into account the radioactive nuclide, and stating the ascent of the function in semilogarithmic presentation, $e=2.71...$ and $x$ = the input voltage of the equalizer amplifier or a pulse rate proportional thereto and that the recording device, recording linearly, is connected with the equalizer amplifier, with which the output voltage of the equalizer amplifier can be measured and can be brought through control of the network to a predetermined value corresponding to the nominal drive (modulation) of the equalizer amplifier in the case of backscattering from a layer of a known thickness of the layer, and which after that can be adjusted to a value which corresponds to the known thickness of the layer.

It is advantageous if the detector is connected with one input of an AND stage and the output of the AND stage is connected with a binary reduction device adjustable in its reduction ratio, which in turn is connected with the integration stage, that the second input of the AND stage can be adjusted jointly with the outlet of a measuring clock which can be adjusted in its measuring time. Thus, essentially always the same number of pulses are fed to the integration stage independently of the measuring time and independently of the fact, whether the duration of measurement is one time, double, quadruple, etc., of the shortest possible measuring duration.

It is favorable if the equalizer amplifier comprises an operation amplifier including a negative feedback branch in which there lie resistance diode branches connected in parallel to one another. Operation amplifiers are very stable in the most varied ways, and they have a high amplification as well as a high input resistance and a comparatively small output resistance. One can buy them as standard elements.

It will be conducive if the equalizer amplifier comprises an operation amplifier whose load resistor is a resistor/diode network. Through such a circuit the initially stated function can be equalized (corrected) piece by piece. The more resistor diode networks, connected in parallel, that are used, the more closely the course of the curve produced will fit the desired course of the curve.

It has turned out to be particularly effective when the load resistor has a series connection of a first resistor having a 0 ohm to a few ohms and four diodes, preferably gold wire diodes, that a second resistor of preferably 10,000 ohms is connected in parallel to the first resistor and the diode succeeding it, that a third resistor of about 1,800 ohms is connected in parallel to the second resistor and to the two succeeding diodes, and that a fourth resistor of preferably a few million ohms to infinite ohms is connected in parallel to the series connection and that from the common point of all resistors up to the inlet of the operation amplifier there lies a negative feedback resistor of preferably 39,000 ohms. It turned out that in the case of such a circuit, the diode return current becomes unproblematic and that this circuit will result in an optimum equalization for the entire area with a minimum of expenditure.

Further advantages and characteristics of the invention will become clear from the succeeding description of a preferred design presented by way of example.

BRIEF DESCRIPTION OF THE DRAWING FIGURES

DETAILED DESCRIPTION OF THE ILLUSTRATED EMBODIMENT

Figure 1:
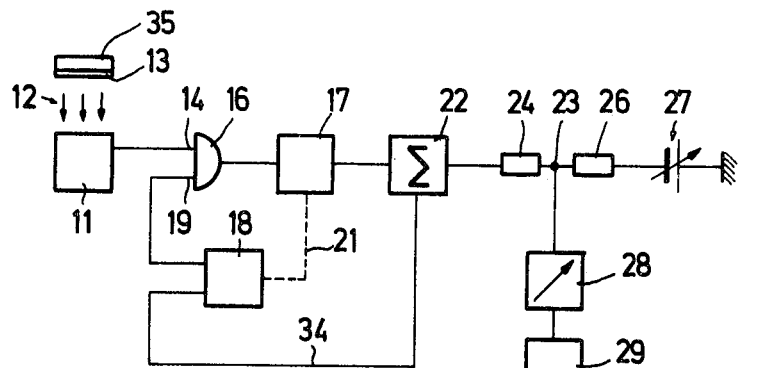
FIG. 1 shows a diagrammatic presentation of the most important circuit elements of the device.

A detector 11 receives backscattered beta rays 12 from a metal layer 13 and a carrier material 35. A pertinent radiator has not been shown and is of a known type. The output of the detector 11 is connected with the first inlet 14 of an AND- stage 16. Its outlet is connected with a binary frequency division device 17. Furthermore, a measuring clock 18 has been provided, whose output is connected with the second input 19 of the AND-stage 16. The dotted line 21 indicates that both the binary frequency division device 17 and the measuring clock 18 jointly can be switched over. The binary frequency division arrangement can consist of several bistable trigger stages connected in series. With the binary frequency division arrangement 17, an integration stage 22 has been connected which produces an output voltage on a common point 23. Two more resistors 24, 26 and a battery 27 have been provided there. The resistors 24, 26 as well as the battery 27 should be understood as an equivalent circuit of a network which may appear different in the commercial form of the apparatus but which operates in the same way.

With the common point 23, a network 28 has been connected which can be controlled in its amplification and damping and which feeds an equalizer amplifier 29. The latter in turn feeds a recording device 31, which, due to a switch 32, has two different sensitivities, whereby the sensitivity in the right-hand position of the switch is fixed and in the left-hand switch position is adjustable by means of a resistance 33. A line 34 connects the measuring clock 18 with the integration stage 22, so that prior to a new measurement the integration stage can be discharged.

The arrangement operates as follows: the radiator, which has not been shown, emits beta rays which have a statistical frequency distribution. Therefore, the backscattered beta rays 12 likewise have a statistical frequency distribution. The longer the counting time is, the less will be the relative scattering of the counted value. Since the distance between two beta particles is quite variable, the measuring value measured in a predetermined constant time will scatter. Pulses from detectors reach the AND-stage 16 which will allow pulses to pass through to the binary frequency divider 17 only within the time period predetermined by the measuring clock 18. If the binary frequency division arrangement 17 is switched to a frequency division ratio of 1:1, then the measuring clock 18 will open the AND-stage 16 during the measuring time $t$. If the measuring clock 18 is switched by means of a knob, which can be operated from the outside, in such a manner that it will open the AND-stage 16 during twice the time, i.e., during $2t$, then the binary frequency division arrangement 17 has been switched to a division ratio of 1:2 and so forth. As a result, upon doubling the measuring time not double the number of pulses but the same number of pulses is applied to the input of the integration stage 22, but with a lesser relative statistical error. The corresponding thing is true for the measuring times $4t$, $8t$, $16t$ or other division ratios. The binary frequency division arrangement 17 produces a constant count rate, which will scatter only with the statistical error. From this, pulses of an equal energy content are derived. These pulses are integrated by the integration stage 22. For example, 10 pulses at its input result in an output voltage of 1 volt, while 20 pulses at its input result in a voltage of 2 volts. Prior to the beginning of a new measuring time, the measuring clock 18 will record via the line 34 of the integration stage 22 that the voltage summed up or integrated up to the end of the measuring time is to become zero. This voltage put out by the integration stage at the end of the measuring time can be entirely or partially compensated with the help of battery 27 which is changeable in its voltage. If one only compensated partially, then an excess voltage will reach the network 28 and will permit a reading.

A measurement takes place as follows: first of all, a carrier material 35 is placed on the measuring table without the metal layer 13, and its backscattering is measured. Such a measurement corresponds to a thickness of the metal layer of zero. Now the battery 27 is shifted for such a length of time until at the common point 23 there is no longer any voltage and the indicating device 31 indicates the zero value in one position of the switch 32. Now an adjusting standard is applied which has a layer of a known thickness and which corresponds to the measuring problem. The thickness of the adjusting standard corresponds almost to the maximally measurable thickness of a layer which had been prescribed through the radioactive nuclide for the pertinent measuring problem. A numerical value pertains to every adjusting standard which must be indicated in the right-hand position of switch 32 by the recording device 31. This numerical value can be adjusted by changes in the amplification factor of the network 28. As a result of that, it will be assured that the equalizer amplifier 29 will neither be overdriven nor underdriven, since it will couple its input voltage with the output voltage in a desired manner only within a certain range, that is to say that the output voltage is connected linearly with the thickness of the layer. The values that are to be fed into the network 28 depend only on the type of material and the thickness of the metal layer 13 and the type of material used as carrier material 35. For example, in the case of measurement of gold on nickel, the network 28 is to be adjusted to a previously known value and in the case of measurement of nickel on aluminum to another previously known value. For this purpose a special regulator, which has not been shown, is provided.

Now, switch 32 is moved into its left-hand position. The recording device 31 now indicates a value which, as a rule, does not coincide with the thickness of the layer of the measuring standard. The sensitivity of the recording device is adjusted with the help of resistor 33 now for such a length of time until the recording device 31 indicates the thickness of the layer of this measuring standard. Thus, every given thickness of layer can now be measured which lies between the value 0 and a measuring value sufficiently below the thickness of the saturation layer. This calibration, furthermore, does not need to be overthrown whenever the measuring time is extended or shortened. Such a calibration takes into consideration completely the geometrics of measurement, the type of radiator, the type of layer to be measured, the type of carrier material and so on.

The assembly units were described earlier diagrammatically. Their structure is derived for the task they have to fulfill. The integration stage 22, on the basis of the task assigned to it, must be capable not only of integrating, but it must also be capable of holding the result of integration for such a length of time until the interrogating impulse emerges form the measuring clock 18. The network 28 may be a passive or an active network. Instead of the adjustable battery 27, the resistor 26 can also be adjusted. The structure of the equalizer amplifier 29 can be determined either by a synthesis of the network or by experiment. It must be capable of putting out a voltage at its output which is directly proportional to the thickness of the metal layer 13. Qualitatively it will, therefore, at first, amplify linearly in this range in which the number of backscattered beta rays 12 is linearly related to the thickness of the metal layer 13. When the metal layer 13 becomes thicker, the number of backscattered beta rays 12 decreases more than proportional by and the amplification of the equalizer amplifier 29 must then increase to this degree. The inverse function of the relationship or connection between thickness of layer and backscattered beta rays has been built in, so to speak, into the equalizer amplifier 29.

The line 34 does not absolutely have to be connected with the integration stage 22. It would also be possible to achieve, in another suitable manner, the result that the same state as prior to the beginning of the integration will be achieved before the beginning of the new measuring time. It will be possible with a signal in the line 34 to also block the network 28 or the equalizer amplifier 29, or else also the recording device 31. One can also control with line 34 an optical or acoustic signal transmitter which would indicate to the operating personnel when the measurement has come to an end and when one is supposed to read the recording device 31.

It is also possible to block switch 32 if an additional signal (recording) device is provided, which, for example, will measure the output voltage of network 28 continuously. In any case it is necessary to produce an indication which is a measure for the volume control of the equalizer amplifier 29 and, furthermore, an indication must be provided for the thickness of the layer measured.

Figure 2:
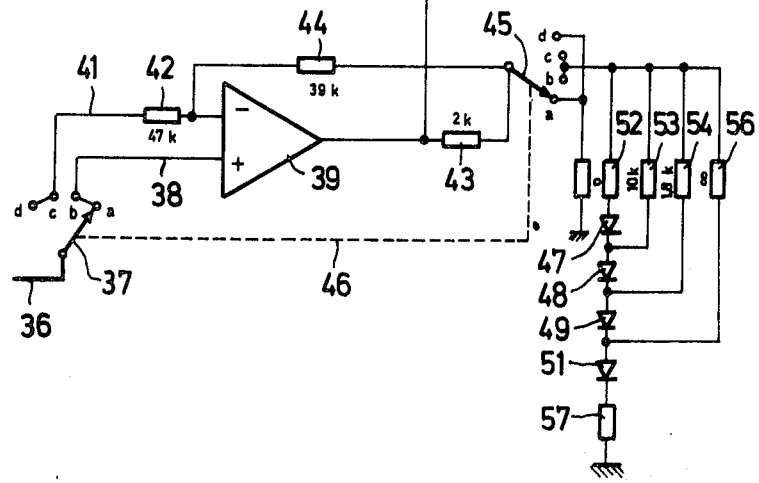
FIG. 2 shows a more precise presentation of the receiver amplifier together with the indicating device.

Let us now describe in more detail and on the basis of FIG. 2 the equalizer amplifier and the recording device. The line 36 comes from the output of network 28 and reaches a switch 37 with four positions $a$, $b$, $c$, $d$. Positions $a$ and $b$ are connected with one another and also positions $c$ and $d$ connected together. A line 38 leads to the positive input of an operational amplifier 39 which can be purchased as a component. A line 41 leads via a resistor 42 to the negative input of the operational amplifier 39. Connected to its outlet is a resistor 43 and from the resistor 43 back to the negative inlet of amplifier 39 there is connected a feedback resistor 44. Resistor 42 causes the feedback resistor to operate with its left-hand end, as viewed in FIG. 2 against a definite input resistance and thus the amplification becomes independent of the electrical data of the amplifier. Resistor 43 is connected with switch 45, which likewise has positions $a$, $b$, $c$, and $d$ and which is connected mechanically, indicated by way of dashed line 46, with switch 37 and is equally rotatable. Switch 45 can connect, in its position $a$, a grounded resistor 47 with resistor 43. The same holds true for position $d$. In positions $b$ and $c$, resistor 43 is connected with the circuit that can be seen on the right in FIG. 2, which has four gold wire diodes 47, 48, 49 and 51, and to which have been connected in the manner drawn the resistors 52, 53, 54 and 56. When simulating closely the curve which is to be equalized, one must first make sure that the resistor 52 and the gold wire diode 47 approximately simulate the curve that is to be equalized. Then the resistor 53 and the gold wire diode 48 are switched on and the simulation is refined and so forth. The resistor 57 serves for the purpose of limiting the current, in case all gold wire diodes 47–51 are conductive, and the resistor 52 must be of very low magnitude for reasons of adjustment. Resistor 57 therefore is only a protective resistor.

From the outlet of the operational amplifier 39 goes a line 58 to a branching off point 59, and from there one line 61 goes to the switch 32 while parallel to this a variable resistor 62 has been connected to the branch point 59. Connected to the switch 32 is a recording installation 31, which is grounded at one terminal thereof. The recording device 31 can record analogously or digitally.

In position $a$ the output voltage of the operational amplifier 39 is connected linearly with the input voltage. These positions are selected when a standardized characteristic line of the beta rays backscattering thickness of layer is to be recorded and when the ordinal number of the layer is larger than that of the carrier material.

Position $b$ is selected if one wants to equalize, whereby the atomic number of the layer is larger than that of the carrier material.

Position $c$ is selected if one wants to equalize and when the atomic number of the layer is lower than that of the carrier material. In such a case the input voltage is negative. Instead of selecting position $c$, one could also reverse the polarity of the recording device 31.

Position $d$ corresponds to the task of position $a$, but when the ratios of the atomic numbers are reversed.

By a standardized characteristic line one understands such a line where the thickness 0 of the layer is assigned to the output voltage 1 is assigned to the thickness of the saturation layer.

Figure 3:
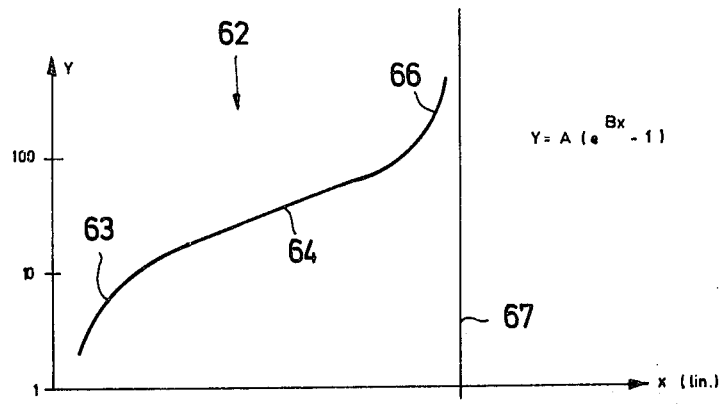
FIG. 3 shows a presentation of the function counted value/thickness of layer/carrier material.
Figure 4:
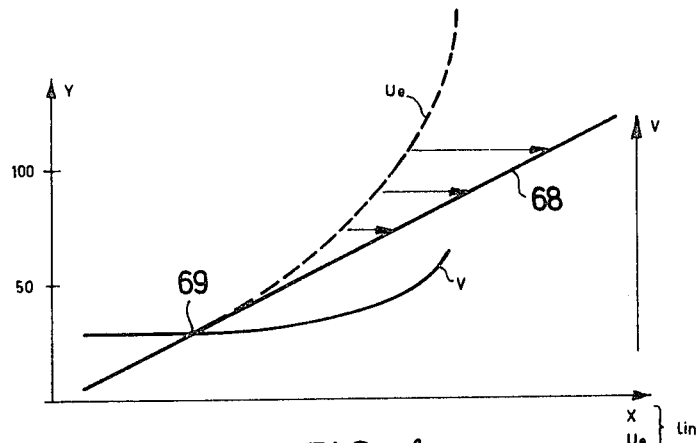
FIG. 4 shows a qualitative presentation of the characteristic line of amplification, of the equalizer amplifier and of the input voltage.

In order to illuminate the tasks of the equalizer amplifier still more clearly, let us discuss FIGS. 3 and 4. FIG. 3 is a presentation on a semilogarithmic scale. Curve 62 has an area 63 curved in accordance with a $e$-function, a linear area 64 and a strongly curved area 66. Only areas 63 and 64 are of interest from the point of view of measurement engineering. In linear presentation, area 63 is linear while the area 64 is curved in accordance with an $e$-function. Curve 62 is given on the right in FIG. 3, the straight line 67 designating the thickness of the saturation layer.

In FIG. 4 the coordinates have been divided linearly and curve $U_2$ has been drawn in a dashed line. One can see that at first the input voltage of the equalizer amplifier 29 grows linearly with the thickness Y of the layer and then decreases more quickly. From this partially curved curve one would like to make the straight line 68. One will succeed in this if one selects a linear amplification up to point 69, that is to say up to the point where the area 63 passes over into the area 64, which amplification then continues to increase.

I claim:

1. A device for measuring the thickness of layers with a radioactive nuclide which bombards the layer and produces an irradiation corresponding in its energy to the thickness of the layer, with a detector which absorbs the backscattered radiation from the layer and from any carrier material that may be present and produces at its outlet a pulse rate in the range between a lower first count corresponding to the backscattered radiation the radiation zero thickness of the layer and an upper second count corresponding to backscattered radiation representing the quasi-endlessly thick layer, and with a signaling device fed by said detector, said device comprising: an integration stage (22) coupled to said detector (11) for producing an output voltage proportional to the pulse rate emitted by said detector (11), a voltage compensation stage (23, 26, 27) connected to said integration stage (22) for producing a compensation voltage equal in magnitude to but opposite in sign to the output voltage of said integration stage (22), which corresponding to the pulse rate of the backscattered radiation (12) pertaining to the zero thickness of the layer, the output voltage of said integration stage (22) and the output voltage of said voltage compensation stage (23, 26, 27) being guided at a common point (23), said common point (23) being connected to a network (28) being controllable in amplification and damping, said network (28) being connected to a second equalizer amplifier (29) linearizing the function $Y=A(e^{Bx}-1)$, wherein:

$Y$ = thickness of the layer to be measured, $A$ = a constant, taking into consideration the difference between the zero thickness of the layer and the thickness of the saturation layer, as well as the radioactive nuclide, the constant stating the parallel shifting the point in semilogarithmic presentation $B$ = a constant, taking into consideration the difference between the zero thickness of the layer and the thickness of the saturation layer, as well as the radioactive nuclide, and stating the ascent of the function in semilogarithmic presentation $e = 2.71 \ldots$ and $x$ = the input voltage of the equalizer amplifier or a pulse rate proportional to it and a linearly operating recording device (31) connected to said equalizer amplifier (29), with which the output voltage of said equalizer amplifier (29) can be measured and through control of said network (28) can be brought to a predetermined value corresponding to the nominal drive of said equalizer amplifier (29) in case of backscattered radiation from a layer (13) of a known thickness and which, after that, can be adjusted to a value which corresponds to the known thickness of the layer.

2. A device according to claim 1, characterized in that said detector (11) is connected to one inlet of an AND-stage (16), the outlet of said AND-stage (16) being connected with a binary frequency division device (17) having an adjustable frequency division ratio connected to said integration stage (22), the other inlet of said AND-stage (16) being adjustable together with the outlet of a measuring clock (18) having an adjustable measuring time.

3. A device according to claim 1, characterized in that said equalizer amplifier (29) comprises an operational amplifier (39) in the negative feedback branch of which lie resistance diode branches switched in parallel to one another.

4. A device according to claim 1, characterized in that said equalizer amplifier (29) comprises an operational amplifier (39), whose operating resistor is a resistor/diode network (43, 47–57).

5. A device according to claim 4, characterized in that said operating resistor has a series connection (52, 47, 48, 49, 51) of a first resistor (52) being 0 ohm to a few ohms in magnitude and four diodes (47–51), preferably gold wire diodes, that a second resistor (53) being preferably 10,000 ohms in magnitude is connected in parallel to said first resistor (52) and to the diode (47) following after it, that a third resistor (54) being of about 1,800 ohms in magnitude is connected in parallel to said second resistor (53) and the two diodes (47 and 48) following after it, and that a fourth resistor being preferably a few million ohms up to infinite ohms in magnitude is connected in parallel to said series connection (52, 47, 48, 49, 51) and that, from the common point of all resistors to the inlet of said operational amplifier, a negative feedback resistor (44) being preferably 39,000 ohms in magnitude is located.

6. A device according to claim 2, characterized in that said equalizer amplifier (29) comprises an operational amplifier (39) in the negative feedback branch of which lie resistance diode branches switched in parallel to one another.

7. A device according to claim 2, characterized in that said equalizer amplifier (29) comprises an operational amplifier (39), whose operating resistor is a resistor/diode network (43, 47–57).

* * * * *